Patented Aug. 19, 1952

2,607,687

UNITED STATES PATENT OFFICE 2,607,687

METHOD OF MAKING A FEED COMPOSITION

James V. Rice, Cincinnati, Ohio, assignor to Buckeye Cotton Oil Company, Memphis, Tenn., a corporation of Ohio No Drawing. Application January 18, 1951, Serial No. 206,720

19 Claims. (Cl. 99—2)

This invention relates to the production of non-toxic cottonseed meal of improved value as animal feed and is a continuation-in-part of Serial No. 142,080, filed February 2, 1950.

Unprocessed cottonseed contain a yellow substance known as gossypol, found in the so-called pigment or resin glands which are scattered through the meat of the seed. In processing the seed, hulls are commonly removed first, and oil is then recovered from the meats, either by pressing or by extracting with a solvent. The remaining substantially oil-free cake, flake or meal is widely used as feed for livestock. As cattle feed, for example, its gossypol content is not important. On the other hand, gossypol is toxic to non-ruminant, single-stomached animals, such for example as swine and poultry, and as a result the meal can be incorporated in the rations of such animals with safety only if the free gossypol therein is low or if it is in some way made non-toxic.

Purchasers of cottonseed meal for feeding purposes have by experience learned to associate a bright golden color with meal of high nutritive value, and to associate a dull muddy color with less desirable meal. Bright colored meal is therefore preferred.

It is an object of this invention to provide cottonseed meal of improved color, of high nutritive value, and non-toxic even to single-stomached animals. It is a further object to provide an inexpensive process for preparing cottonseed meal of low, free gossypol content. These and other objects are achieved by treatment of the cottonseed meats, preferably but not necessarily after removal of the oil, with aniline (or other amines of the classes to be described) in the presence of water, as more fully described hereinafter.

In processing cottonseed, the dehulled meats are first rolled to a thin flaked form. The mechanical rolling or flaking does not rupture in appreciable amounts the pigment glands of the meats, most of which survive this treatment intact. Oil is next separated from the meats, usually either by expression or by extraction with a solvent.

In the former case, either some form of hydraulic press, or a screw press, frequently known as an "expeller," is commonly used. In the hydraulic press method, it is prevalent practice to adjust the flakes to a moisture content of about 11–12 per cent water, and then to heat or "cook" in order inter alia to reduce the moisture content to an optimum for oil expression, e. g. about 5–6 per cent. The cooking is usually limited to an hour or two and to a maximum temperature of about 230–240° F., although pressure cooking at temperatures up to 260–270° F. for brief periods of time is permissible. Following the cooking, oil is removed by hydraulic box or cage presses, leaving a press cake of some 5 or 6 per cent oil content, commonly referred to as "substantially oil-free." This press cake may be marketed as such, although more frequently it is ground to a meal.

The cooking step in the above process is introduced for oil expression efficiency. As a result of such heat treatment in the presence of water, the walls of the pigment glands are weakened, so that they readily rupture when subjected to pressure or friction. Such rupture liberates gossypol, which spreads throughout the flakes and appears to unite chemically with the protein thereof, perhaps with the amino or the carboxyl groups of the protein. Whatever the chemical nature of the change may be, it is well known that the toxicity of the resulting meal is reduced and that the free gossypol content is likewise reduced, e. g. according to good United States practice to 0.1 per cent or less by weight. Except for small amounts which are carried out in the oil, most of the rest of the original gossypol remains in the finished meal in a non-toxic and difficultly removable form, known as "bound" gossypol. The conversion of toxic free gossypol of intact pigment glands into non-toxic bound gossypol of ruptured glands is brought about and facilitated by heat, pressure and contact with water. Heating above about 240° F. is commonly avoided, however, since at such high temperatures more or less denaturing of the protein takes place, with resulting decrease in nutritive value, and this is accompanied by a darkening and dulling of the color.

In the screw press or expeller method of removing oil, rolling and pre-cooking the moist meats are again employed, approximately the same temperature limitations being set in this case as in the case of hydraulic pressing. Due to the higher pressures involved, cooling is usually required to counteract the frictional heat developed in screw pressing. The resulting meal is commonly drier, of lower oil content, and since a larger proportion of the pigment glands are ruptured in this process, the free gossypol content of the screw-pressed meal is lower.

Instead of using pressure, the oil can be removed from flaked cottonseed meats by extraction with a low boiling solvent, for example with hexane or other saturated or unsaturated hydrocarbon solvents, of which pentane, heptane, cyclohexane, hexene, heptene and benzene are examples, or with halogenated hydrocarbons of which carbon tetrachloride and trichlorethylene are examples. Water interferes with extraction of oil by such solvents, and it is common to heat the meats, e. g. to 160–170° F., before contacting them with the solvent, in order to reduce their water content and make them more pliable for the flaking operation. After extraction and drainage of solvent, the wet flakes are desolventized by heating and blowing with steam. In order to expel remaining water, a toasting step, involving heating the nearly dry flakes to, for example, 230–240° F. is commonly practiced before the flakes are finally ground to a meal. In the extraction process as described, few of the pigment glands are ruptured, and even after final toasting the free gossypol content is high.

The above discussion explains why solvent-extracted meal, commonly containing upward of 0.06 to 0.1 per cent free gossypol, is not a satisfactory feed for single-stomached animals such as swine or poultry unless some precautions are taken to remove or detoxify the gossypol which it contains. Ways of doing this are known, but each involves some step which increases the plant processing and equipment cost or affects some property of the meal adversely. Thus heating the flakes or meal in the presence of water detoxifies the gossypol, but at the same time it denatures some of the protein, decreasing nutritive value and darkening the color. Extracting the substantially oil-free spent flakes (i. e. either wet or dry flakes which have been extracted but have not yet been toasted or ground) with ethyl ether or some other gossypol-solvent is possible, but obviously uneconomical. Extracting oil from the flakes with a mixture of methanol and a solvent hydrocarbon has been proposed (U. S. 2,484,831), but such a process involves operational difficulties in plant equipment and procedure.

I have found that substantially oil-free cottonseed meals or flakes which contain enough free gossypol to be toxic to single-stomached animals (i. e. about 0.06 to 0.1 per cent or more of free gossypol) can be rendered harmless to such animals and their free gossypol content can be reduced, by suitable treatment with a suitable amine in the presence of water at or above normal room temperature, as will appear hereinafter. I have also found that addition of a suitable amine to the flaked oil-containing cottonseed meats, prior to the cooking step, in the hydraulic expression process described hereinbefore, substantially reduces the free gossypol content of the cottonseed meats resulting from this process, and consequently renders such meal harmless to single-stomached animals.

The process will first be described in a simple and preferred form using aniline, and variations thereof will be described in later paragraphs. This treatment ruptures pigment glands, liberates free gossypol and allows it to spread throughout the cottonseed meat. The liberated gossypol is thus contacted with and enabled to combine with either the protein of the meat to form non-toxic "bound" gossypol, or with aniline to form a non-toxic compund therewith, such as the well known and stable compound commonly designated "dianiline-gossypol." Either of these reactions would be expected to detoxify the gossypol and I believe that both of them take place. However, I do not wish to be bound by any theoretical explanation of the detoxification which results from the treatment by my process, nor to exclude the possibility that it may be due in whole or in part to other reactions than these. In treating substantially oil-free cottonseed meal or flakes, the rupturing of the glands and the subsequent detoxification of the gossypol takes place slowly at room temperature. In order to accelerate these processes and to prepare for grinding and sacking, I prefer to heat the aniline-treated material to at least 140° F. for a sufficient time both to detoxify and dry it, but I prefer to avoid more prolonged or drastic heating than is necessary. Specifically, I avoid heating sufficiently to produce substantial denaturing of the protein such as occurs at temperatures which much exceed 240° F.

In treating oil-containing cottonseed meats, the detoxification is to take place during the cooking step i. e. when the aniline is added to the cottonseed meats prior to the cooking step, the aforementioned temperature limits should normally be observed to avoid denaturing the protein in the cottonseed flakes.

I have indicated that my detoxification process may be practiced with substantially oil-free cottonseed meats or with cottonseed meats from which no oil has been removed. I prefer, however, to practice this invention with meats from which the oil has been removed, in order to avoid adverse effects on oil quality.

The amount of aniline required depends upon the amount of free gossypol in the meats to be treated and upon other conditions of treatment, such as the proportion of water and the temperature and time of contact. Under optimum conditions, small amounts of aniline are markedly effective, such as 0.1 per cent, based upon the dry weight of material to be treated. Larger amounts can be more easily distributed uniformly and are more beneficial, but seldom is more than one per cent required, and in general I prefer to use no more than is necessary for detoxification.

Since aniline itself is toxic, it is also essential that substantially all free aniline be eliminated from the treated cottonseed flakes. Therefore, I prefer, as a precautionary measure, in case any excess of aniline was used over that needed to detoxify the cottonseed flakes, to contact the treated flakes with open steam for about five to 30 minutes, during the latter part of the detoxification treatment, whereby the excess aniline is distilled off.

In order to distribute the aniline uniformly throughout the material and to make detoxification effective, I prefer to disperse it in water before or while mixing it with the meal or flakes. Thorough mechanical mixing is required. Water aids not only in distributing the aniline but also in rupturing the walls of unruptured pigment glands and thus in liberating the gossypol, which is prerequisite to detoxifying it. The amount of water should be several times the weight of aniline, and in general I find it is desirable that it be at least four times the weight of aniline. Greater efficiency of detoxification has been observed with increasing ratios of water-to-aniline up to at least 22:1. Higher ratios may be employed if desired, but a practical limit is set because of the necessity of later driving off the water in order to prepare the material for grinding, sacking, etc.

In treating solvent-extracted flakes by my process, the flakes can either be wet with the solvent (as after gravity drainage) or the solvent can first be driven off before the contact with aniline. In the former case, both the original solvent and water added in the treatment must later be driven off; in the latter case, only water must later be removed. In case flakes are used which are wet with a low boiling solvent, such for example as hexane, the aniline and water can be added prior to the heat treatment by which the flakes are desolventized, the solvent and at least a part of the water being later distilled off. In this case, it is often desirable to condense the distillate, collect the condensate as two immiscible layers, one of water and the other of solvent, and separate the solvent layer for use in extracting oil from a fresh batch of cotton-seed flakes. To complete the drying and desolventizing, I usually toast the nearly dry aniline-treated flakes for 15-20 minutes at 230-240° F., but such toasting should not be so prolonged nor at a temperature so high as to reduce the nutritive value of the meal by denaturing protein therein. Rapid, short-time (10 minutes) toasting under pressure at as high as 260° F. has been employed without harmful effect.

As previously indicated, most of the pigment glands in solvent-extracted flakes remain intact. Mechanical rupture of these glands by attrition in the presence of aniline and water can be practiced if desired, and this is in some instances advantageous.

The aniline treatment of the invention is especially valuable when applied to solvent-extracted cottonseed flakes, which normally contain unruptured pigment glands and an amount of free gossypol in excess of 0.1 per cent by weight, but it is not restricted thereto. It is applicable to any substantially oil-free cottonseed meals or flakes high in free gossypol, irrespective of their previously oil-removal history. Furthermore, it is applicable to cottonseed meals or flakes, whether pressed or solvent-extracted or otherwise rendered substantially oil-free, which contain less than about 0.06% to 0.1 per cent free gossypol, i. e. insufficient free gossypol to be toxic, but sufficient to interfere with the maximum nutritional value of the product. Thus when the free gossypol content is less than about 0.06 to 0.1 per cent, the meal is no longer toxic to single-stomached animals, and yet a meal containing, for example, 0.06 per cent free gossypol is not so good a feed as one containing two-thirds this amount. The presence of, or variations in the amount of, free gossypol at levels below about 0.04 per cent does not appear to affect demonstrably the nutritive value of the meal. With non-toxic meal containing intermediate amounts of free gossypol the nutritive value is markedly increased by the aniline-water treatment of my invention. The effect is similar to what might be expected if there were present in the untreated material some harmful ingredient other than gossypol which previous methods of detoxification have been unsuccessful in eliminating but which the aniline treatment succeeds in overcoming.

Hydraulic- or screw-pressed cottonseed meals are illustrative of meal which normally contains less than 0.1 per cent free gossypol, and which is benefited by the aniline-water treatment of the invention. The free gossypol content of such meal can in this way be reduced and the nutritive value thereof increased.

As hereinbefore indicated, the invention is useful not only in reducing free gossypol, in rendering it non-toxic and in increasing nutritive value; it also improves the color of the resulting meal, making it a bright golden yellow. This effect is especially marked when hydraulic-pressed or screw-pressed meal is dealt with, since one objectionable feature of such meals heretofore has been their poor color. The improved color of meal treated by my process persists even when the heating involved therein is to temperatures as high as 260-270° F.

Up to this point, the invention has been described in terms of treatment with aniline and water. Instead of aniline, however, there can be used any amine belonging to the group having the formulae

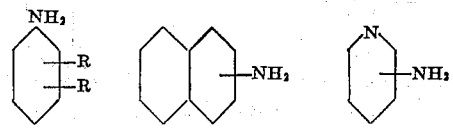

where each R belongs to the group consisting of hydrogen, alkyl, halogen, alkoxy, phenyl, amino phenyl, alkyl amino phenyl, and amino benzyl, the alkyl radical in all cases comprising not more than 2 carbon atoms.

Specific examples of these types of amines are:

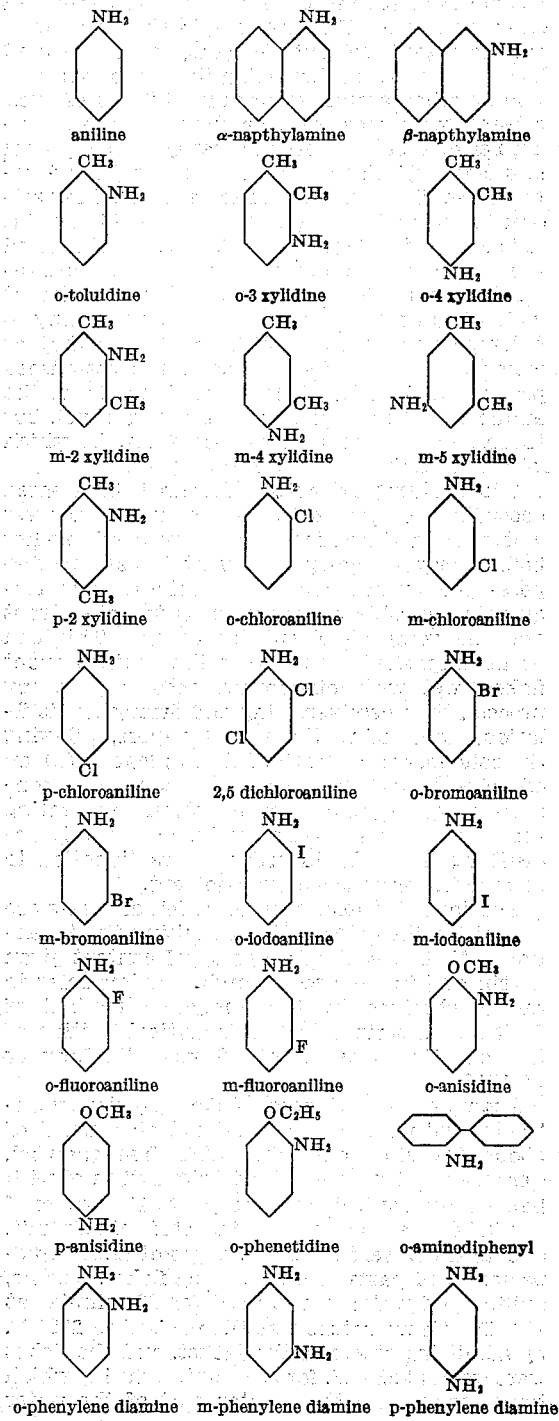

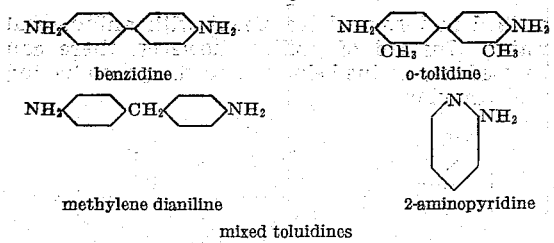

benzidine  
o-tolidine  
methylene dianiline  
2-aminopyridine  
mixed toluidines These amines can be used with satisfactory results, to accomplish the purposes of this invention, using them in amounts equivalent in amino nitrogen to the aniline usage previously described, e. g. in such amounts that the weight of amino nitrogen is at least 0.015 per cent of the weight of the meal or flakes to be treated, although it is seldom necessary to use more than 0.15 per cent amino nitrogen. Furthermore, low boiling water-soluble organic solvents for gossypol can be used instead of water as dispersing liquids for the aniline or other amine, especially mixtures of such solvents with 5 per cent or more of water. Examples of such solvents are methyl, ethyl, propyl and isopropyl alcohols, acetone, methyl ethyl ketone, and dioxane. By the term "low boiling solvent" I mean herein one having a boiling point not substantially above 212° F. It should be noted that these organic solvents, being volatile, are removed from the flakes by the heat treatment which is a part of my process, i. e. by heating to a temperature above 140° F. but below that at which substantial denaturing of the cottonseed protein would take place. The function of the amine is not to dissolve or remove gossypol, but to convert it into a non-toxic form, in which form it remains in the finished product.

When solvent-extracted flakes are being treated according to that modification of my process wherein a mixture of water and water-soluble low boiling organic gossypol-solvent is used to disperse the aniline (or other amine), it is frequently desirable to recover both the oil-solvent and the gossypol-solvent for re-use. This can be accomplished by treating the drained spent flakes, wet with oil-solvent, according to my process, then desolventizing and drying by distillation, condensing the mixed vapors, allowing the condensate to stratify into two layers, (a) an oil-solvent layer and (b) an aqueous layer containing the organic gossypol-solvent, separating these two layers mechanically, and finally redistilling layer (b) in order by fractionation to recover the organic gossypol-solvent.

The following examples, in which all parts are by weight, illustrate without limiting the invention. All figures for free gossypol content given herein and in the accompanying claims refer to results obtained by the analytical method of Smith, as described in the Analytical Edition of Ind. and Eng. Chem., vol. 18, page 43, January 15, 1946.

*Example 1.*—Cottonseed flakes, previously extracted with hexane to a residual oil content of about 1% and containing 1.2% free gossypol, were used. Gravity-drained flakes, still wet with hexane and equivalent in weight to 1000 parts of dry flakes, were placed in a jacketed mixing unit, and to them were added 6.7 parts of aniline dispersed in 44 parts of water. The flakes, hexane, aniline and water were mixed for 20 minutes at 100° F. Temperature was then raised to 230° F. by admitting steam to the jacket, and the flakes were dried at 230° F. for 20 minutes, during which time hexane and the greater part of the water were evaporated. The flakes were then ground to a bright golden yellow meal, which contained 0.04% free gossypol. In this example the weight of amino nitrogen in the aniline used was 0.1% of the weight of dry flakes.

Similar results were obtained by similar aniline treatment of a like batch of hexane-extracted dry flakes from which the hexane had previously been driven off.

*Example 2.*—To 1000 parts (on a dry basis) of hexane-extracted spent cottonseed flakes, drained but still wet with hexane and containing 1.00% free gossypol on a solvent-free basis, there was added a mixture of 2.09 parts of aniline, 8.8 parts of water and 85 parts of methanol. The wet flakes were mixed at 70° F. to 100° F. for 20 minutes in a jacketed mixer. They were then desolventized at 160° F. and finally toasted for 20 minutes at 230° F., the heat being supplied by admitting steam to the jacket of the mixer. Free gossypol in the finished product was reduced to 0.07% by this treatment. In this example, the weight of amino nitrogen in the aniline used was about 0.03% of the weight of dry flakes.

*Example 3.*—To 1000 parts (dry basis) of hexane-extracted spent cottonseed flakes, drained but still wet with hexane and containing 1.00% free gossypol on a solvent-free basis, there were added 7.7 parts of commercial mixed toluidines dispersed in 55 parts of water. After thorough mixing at 70° F. to 100° F. for 15 minutes, the mixture was heated to 230° F. for 15 minutes. The free gossypol was reduced to 0.05% by this treatment. In this example, the weight of amino nitrogen in the toluidines was 0.1% of the weight of dry flakes.

It may be explained that in a series of runs, in each of which the material is first mixed and then heated by admitting steam to the mixer jacket, the mixer retains some heat from the preceding run. Consequently, although the charge may be introduced at normal temperature, the temperature rises somewhat during mixing, the average temperature at this stage being usually between 70° F. and 100° F.

Table 1 shows the free gossypol content resulting from repeating Example 3, but substituting other amines for toluidine, the amount of amine in each case being such that the weight of amino nitrogen therein was 0.1% of the weight of dry flakes.

*Table 1*

| Amine | Percent Free Gossypol |
|---|---|
| (None) | (1.00) |
| Ortho anisidine | 0.02 |
| Ortho phenetidine | 0.05 |
| Ortho aminodiphenyl | 0.14 |
| Ortho chloroaniline | 0.17 |

*Example 4.*—Into 1000 parts of hydraulic pressed cottonseed meal containing 0.09% free gossypol, there were mixed 5 parts of aniline dispersed in 55 parts of water. The mixture was held at 70° F. to 100° F. for 15 minutes, then heated to and held at 230° F. for 15 minutes. The free gossypol in the finished meal was 0.04%. The amino nitrogen in this example was 0.075% of the weight of flakes treated.

All of the meals produced in Examples 1 to 4 were of a bright yellow or golden color. Table 2 below illustrates the appearance and the free gossypol content of flakes which, after solvent extraction with hexane and subsequent gravity drainage, were subjected to the aniline-water treatment, samples being analyzed at various stages of the treatment.

*Table 2*

| Test No. | 1 | 2 | 3 | 4 | 5 | 6 | 7 | 8 |
|---|---|---|---|---|---|---|---|---|
| Percent Aniline [1] | 0.4 | 0.4 | 0.4 | 0.4 | 0.57 | 0.57 | 0.57 | 0.57 |
| Water to Aniline Ratio in Treatment Solution | 4.4 | 6.6 | 8.8 | 21.9 | 4.4 | 6.6 | 8.8 | 13.2 |
| Percent Free Gossypol after 20 min. mixing [1] Temp. 100° F | 0.92 | 0.67 | 0.62 | 0.40 | -------- | 0.14 | 0.17 | 0.15 |
| Percent Free Gossypol after desolventizing Temp. 160° F | 0.62 | 0.37 | 0.26 | 0.24 | 0.18 | 0.08 | 0.07 | 0.10 |
| Percent Free Gossypol after heating to 230° F | 0.46 | 0.18 | 0.13 | 0.15 | 0.12 | 0.05 | 0.04 | 0.06 |
| Percent Free Gossypol after toasting for 10 min. at 230° F | 0.48 | 0.15 | 0.13 | 0.13 | 0.12 | 0.04 | 0.03 | 0.03 |
| Meal Color | Bright Yellow | Br. Yel. | Br. Yel. | Light Brown | Golden Yellow | Gold. Yel. | Gold. | Gold. |

[1] Calculated on weight of dry flakes.

It will be perceived that the free gossypol content decreases (a) with higher aniline:flakes ratio; (b) with higher water:aniline ratio; (c) with higher temperature, although prolonging the heating at 230° F. produces no appreciable change in free gossypol content.

The table fails to show the observed facts that the aniline treatment increases the lightness and brightness of the yellow color of the meal, and that the improvement in color is less marked as the water content of the aniline-water mixture increases.

The suitability of the detoxified meal of my invention for feeding to single-stomached animals is illustrated by the following feeding experiments which were carried out with guinea pigs under controlled conditions. Soybean meal (gossypol free and well known to be a good food for such animals) was used for comparative purposes. The basal ration is shown in Table 3.

*Table 3*

| | |
|---|---|
| Cottonseed (or soybean) meal | percent 25 |
| Dehydrated alfalfa meal | do 25 |
| Rolled oats, ground | do 30 |
| Wheat bran | do 10 |
| Hydrogenated vegetable shortening | do 5 |
| Iodized salt | do 1 |
| Ground limestone | do 2 |
| Brewer's yeast | do 2 |
| Vitamin C, crystalline | g./kilo of ration 1 |

Table 4 below shows the results of feeding tests with these rations.

*Table 4*

| Meal, Kind | Soybean | Cottonseed [1] |
|---|---|---|
| Meal, How Treated | | [1] Aniline-H₂O |
| Meal, Percent Free Gossypol | | 0.04 |
| Meal, Percent Bound Gossypol | | 0.56 |
| Ave. Initial Wt. of Guinea Pigs, gms | 264 | 262 |
| Ave. Gain to 4 weeks, gms | 153 | 170 |
| Ave. Gain to 8 weeks, gms | 287 | 331 |
| No. of animals at start | 5 | 5 |
| No. of animals died | 0 | 0 |
| Gms. of feed/gm. gain in weight | 5.33 | 5.05 |

[1] Wet hexane-extracted flakes treated at 70° F. to 100° F. with 1 pound of aniline in 14 pounds of water per 100 pounds of dry flakes were toasted for 20 min. at 230° F. to remove hexane and water.

*Example 5.*—Hulled cottonseed meats were rolled to a thickness of 0.014 inch. A portion of these meats was placed in the top portion of a double cooker and heated to 190° F. for 15 minutes. (Open steam was used for 5 minutes to increase the flake moisture.) The flakes were dropped to the lower kettle and heated to 220° F. for 40 minutes after which they were formed and placed in a hydraulic press at 5200 p. s. i. for 20 minutes. Samples of the resultant meal were analyzed for gossypol content.

A second run was made following the same procedure as above except that a mixture of 1 part aniline and 8 parts water was added to 91 parts cottonseed flakes in the cooker before the start of this second run. No open steam was used during the heating of the flakes in this run, but open steam was employed during the last ten minutes of the cooking period to distill off the excess aniline. Samples of the meal from this second run were also analyzed for gossypol.

A comparison of the gossypol content of the two types of meal are shown below.

| | Flaked Meats | Hydraulic Meal | Aniline-treated Hydraulic Meal |
|---|---|---|---|
| Percent Free Gossypol | 0.838 | 0.102 | 0.015 |

The lower per cent free gossypol found in the aniline-treated hydraulic meal indicates aniline was definitely an aid in detoxifying the meal.

By employing the conditions of each of those of the specific examples, except for the substitution of the amines hereinbefore described for the aniline and mixed toluidines thus employed, comparable results are achieved.

It will be understood that while my process is commonly applied to cottonseed meal or flakes, it is applicable also to cottonseed meats in any other form which offers large surfaces for contact with the aniline-water mixture. When I use the expression "intimately contacting" said meats with the liquid-treating agents of the invention, I mean that the meats must be in such form as to have a high ratio of surface to mass. Thus, for example, the process is applicable both to solvent extracted flakes, to the ground meal therefrom, or to the meal obtained by grinding hydraulic- or screw-pressed cakes. Furthermore, the non-toxic meal need not be used alone; it can be mixed with other constituents useful in animal feed such for example as those listed in Table 3, of Example 4. Also, if the meal, after treatment, still contains sufficient gossypol to render it toxic, it can be mixed with other constituents useful in animal feed to reduce the free gossypol content of the mixed feed to a non-toxic level. Thus, it is within the scope of the invention to use the product as either a major or a minor constituent of animal feed, whether for single- or multi-stomached animals. Furthermore, the invention is not limited to a process which produces cottonseed meal for use only as feed for domestic or other animals; the use of such meal for human consumption is also contemplated. While the meats subjected to the treatment are preferably substantially oil-free, the treated material can if desired be enriched by adding cottonseed oil or other vegetable seed oil thereto.

Having thus described my invention, what I claim and desire to secure by Letters Patent is:

1. A process for improving the nutritive value of cottonseed meats containing free gossypol which process comprises the step of intimately contacting said meats with an amine belonging to the group consisting of

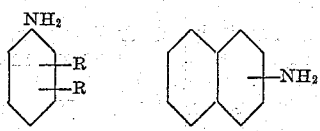

and

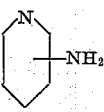

wherein each R is selected from the group consisting of hydrogen, alkyl, halogen, alkoxy, phenyl, amino phenyl, alkyl amino phenyl and amino benzyl, the alkyl radical in all cases comprising not more than two carbon atoms, in the presence of a liquid of the class consisting of water and mixtures of water with a low boiling, water-soluble, organic solvent for gossypol.

2. A process for reducing the free gossypol content of substantially oil-free cottonseed meats containing at least 0.04% free gossypol, which process comprises the step of intimately contacting said meats with an amine belonging to the group consisting of

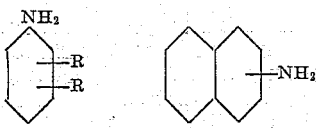

and

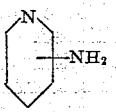

wherein each R is selected from the group consisting of hydrogen, alkyl, halogen, alkoxy, phenyl, amino phenyl, alkyl amino phenyl and amino benzyl, the alkyl radical in all cases comprising not more than two carbon atoms, in the presence of a dispersing liquid of the class consisting of water and mixtures of water with a low boiling water-soluble organic solvent for gossypol and heating the mixture to a temperature in excess of 140° F. but insufficient to cause substantial denaturing of protein in the meats, the amine being in such amount that the weight of amino nitrogen therein is from 0.015% to 0.15% of the weight of said meats, and the weight of dispersing liquid being at least four times the weight of said amine.

3. A process for substantially detoxifying cottonseed flakes containing free gossypol, which comprises intimately contacting said flakes prior to oil removal with an amine belonging to the group consisting of

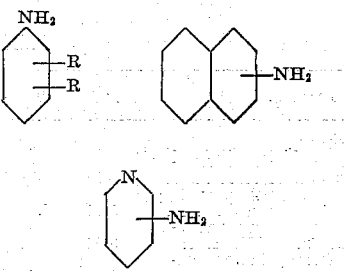

wherein each R is selected from the group consisting of hydrogen, alkyl, halogen, alkoxy, phenyl, amino phenyl, alkyl amino phenyl and amino benzyl, the alkyl radical in all cases comprising not more than two carbon atoms, in the presence of a dispersing liquid of the class consisting of water and mixtures of water with a low boiling water-soluble organic solvent for gossypol, heating the mixture to a temperature in excess of 140° F. but insufficient to cause substantial denaturing of protein in the flakes, and pressing the oil from the flakes.

4. A process of improving the nutritive value of substantially oil-free cottonseed meats containing free gossypol in an amount sufficient to be harmful when fed to single-stomached animals, which process comprises wetting and intimately contacting said meats with aniline in the presence of water, and heating said wetted meats, thereby reducing the free gossypol content thereof.

5. A process of detoxifying oil-containing cottonseed meats containing free gossypol which comprises wetting and intimately contacting said meats with aniline in the presence of water, heating said wetted meats, thereby reducing the free gossypol content thereof, and contacting said meats with open steam whereby any excess aniline is distilled off.

6. A process of improving the nutritive value of substantially oil-free cottonseed meats containing free gossypol in an amount sufficient to be harmful when fed to single-stomached animals, which process comprises wetting and intimately contacting said meats with aniline in the presence of water, heating said wetted meats, thereby reducing the free gossypol content thereof, and contacting said meats with open steam, whereby any excess aniline is distilled off.

7. A process of improving the nutritive value of gossypol-containing substantially oil-free cottonseed meats containing ruptured pigment glands, which process comprises intimately contacting said meats with at least 0.1 per cent of their weight of aniline in the presence of a low boiling water-soluble organic gossypol solvent which contains at least 5 per cent water.

8. A process of improving the nutritive value of substantially oil-free cottonseed meats containing intact pigment glands, which process comprises intimately contacting said meats with aniline in the presence of water and subjecting said meats, in the presence of aniline and water, to attrition sufficient to rupture said glands.

9. A process of detoxifying solvent-extracted cottonseed flakes comprising free gossypol, which process comprises intimately contacting said flakes with from 0.001 to 0.01 times their weight of aniline in the presence of an amount of water at least four times the weight of the aniline, and heating the mixture at about 140° to 240° F. for a time sufficient to detoxify the free gossypol and insufficient to effect substantial denaturing of protein.

10. A process of detoxifying solvent-extracted cottonseed flakes containing free gossypol in an amount harmful for animal feeding purposes, which process comprises intimately contacting said flakes, wet with the extraction solvent, with aniline in the presence of water, and distilling off substantially all solvent and at least part of the water at a temperature in excess of 140° F. but insufficient to cause substantial denaturing of protein in the flake.

11. A process of rendering cottonseed meal suitable as feed for single-stomached animals, which process comprises the steps of intimately contacting hexane-extracted cottonseed flakes, wet with hexane, with an amount of aniline equal to from 0.1 per cent to 1.0 per cent of the flakes on a dry basis and an amount of water equal to at least four times the weight of the aniline; distilling off the hexane and at least part of the water from the mixture by heating said mixture to a temperature above 140° F. and insufficient to cause substantial denaturing of protein; condensing the distillate; collecting the condensate as two immiscible liquid layers, one of water and the other of hexane; and separating the hexane layer for use in extracting oil from another batch of unextracted cottonseed flakes.

12. A method of improving the color of cottonseed meal which comprises mixing (a) substantially oil-free cottonseed meats which have a high ratio of surface to mass and which contain intact pigment glands, (b) aniline amounting to at least 0.1 per cent of the weight of said meats, and (c) water amounting to at least four times the weight of the aniline; heating the mixture to at least 140° F.; driving off the greater part of the water, and heating the nearly dry remaining material to a temperature not exceeding 260° F., thereby rupturing pigment glands and dispersing at least a portion of the gossypol content thereof throughout the material.

13. A method of improving the color of cottonseed meal derived from cottonseed meats which comprises mixing (a) oil-containing cottonseed meats which have a high ratio of surface to mass, (b) aniline amounting to at least 0.1 per cent of the weight of said meats, and (c) water amounting to at least four times the weight of the aniline; heating the mixture to at least 140° F., thereby rupturing pigment glands and dispersing the gossypol content thereof throughout the material; driving off the greater part of the water and pressing the oil from the meats, whereby substantially oil-free cottonseed meal is obtained.

14. An animal feed of improved nutritive value comprising cottonseed meal containing dianiline gossypol derived from the original free gossypol content of the cottonseed from which the meal was prepared and a residue of free gossypol in non-toxic amount.

15. A substantially oil-free cottonseed meal of improved nutritional value whose gossypol content is substantially wholly non-toxic dianiline gossypol.

16. Cottonseed meal of improved nutritional value whose gossypol content exists, as a non-toxic aniline compound of gossypol and free gossypol in non-toxic amount, the free gossypol being less than 0.1 per cent by weight of the meal.

17. A cottonseed meal of improved color comprising a non-toxic compound of gossypol derived from the original free gossypol content of the cottonseed meal and an amine belonging to the group consisting of

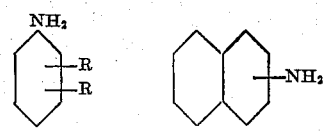

and

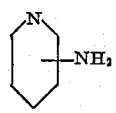

wherein each R is selected from the group consisting of hydrogen, alkyl, halogen, alkoxy, phenyl, amino phenyl, alkyl amino phenyl and amino benzyl, the alkyl radical in all cases comprising not more than two carbon atoms, and a residue of free gossypol in non-toxic amount.

18. A process of improving the nutritive value of cottonseed meats containing free gossypol which comprises intimately contacting said meats with aniline in the presence of water to react said aniline with gossypol and thereafter removing free aniline from the thus treated meats.

19. A process of improving the nutritive value of cottonseed meats containing free gossypol which comprises intimately contacting said meats with from 0.001 to 0.01 times their weight of aniline in the presence of water to react said aniline with gossypol.

JAMES V. RICE.

REFERENCES CITED

The following references are of record in the file of this patent:

UNITED STATES PATENTS

| Number | Name | Date |
|---|---|---|
| 1,553,634 | Sawyer | Sept. 15, 1925 |
| 2,064,158 | Harrel et al. | Dec. 15, 1936 |
| 2,316,014 | Alcott | Apr. 6, 1943 |
| 2,484,831 | Hutchins et al. | Oct. 18, 1949 |